United States Patent [19]

Schabert

[11] 4,297,167
[45] Oct. 27, 1981

[54] NUCLEAR REACTOR INSTALLATION

[75] Inventor: Hans-Peter Schabert, Erlangen, Fed. Rep. of Germany

[73] Assignee: Kraftwerk Union Aktiengesellschaft, Mulheim an der Ruhr, Fed. Rep. of Germany

[21] Appl. No.: 820,117

[22] Filed: Jul. 29, 1977

[30] Foreign Application Priority Data

Jul. 30, 1976 [DE] Fed. Rep. of Germany ....... 2634295

[51] Int. Cl.³ .............................................. G21C 9/00
[52] U.S. Cl. .................................. 376/273; 376/283; 376/313; 376/293
[58] Field of Search ...................... 176/37, 38, DIG. 2, 176/60; 61/0.5, 11, 12, 13; 52/169.16

[56] References Cited

U.S. PATENT DOCUMENTS

| | | | |
|---|---|---|---|
| 3,021,273 | 2/1962 | Dix | 176/38 |
| 3,232,843 | 2/1966 | Went et al. | 176/38 |
| 3,712,851 | 1/1973 | Isberg et al. | 176/38 |
| 3,779,865 | 12/1973 | Schafstall et al. | 176/38 |
| 4,045,289 | 8/1977 | Seidensticker et al. | 176/87 |
| 4,077,837 | 3/1978 | Schabert et al. | 176/38 |
| 4,087,323 | 5/1978 | Sullivan et al. | 176/38 |
| 4,118,278 | 10/1978 | Wampole | 176/38 |
| 4,120,750 | 10/1978 | Forster et al. | 176/60 |
| 4,167,087 | 9/1979 | Schabert et al. | 176/DIG. 2 |

OTHER PUBLICATIONS

Carl Bom et al., "On the Design & Containment of Nucl. Power Stations Located in Rock", 1958, pp. 101–106.
Karpenko et al., Underground Sitting of Nucl. Power Reactors, Oct. 1974, pp. 1–22.
Schweiz, Oct. 1958, p. 627.
Rogers, Underground Nucl. Power Plants, Nucl. News, May 1971, pp. 36–39.

Primary Examiner—Sal Cangialosi
Attorney, Agent, or Firm—Herbert L. Lerner

[57] ABSTRACT

Nuclear reactor installation having a concrete cell disposed beneath the earth of a hill for enclosing activity-carrying components includes at least one additional concrete cell disposed in the earth separated from the first-mentioned concrete cell, the additional concrete cell having at most one-fortieth the volume of the first-mentioned concrete cell and being at least predominantly of shell-like construction, and including equipment of use for the nuclear reactor installation received in the additional concrete cell.

25 Claims, 5 Drawing Figures

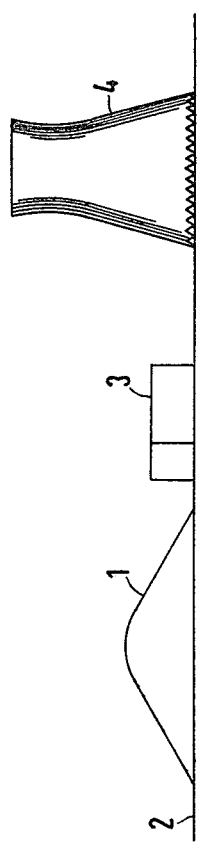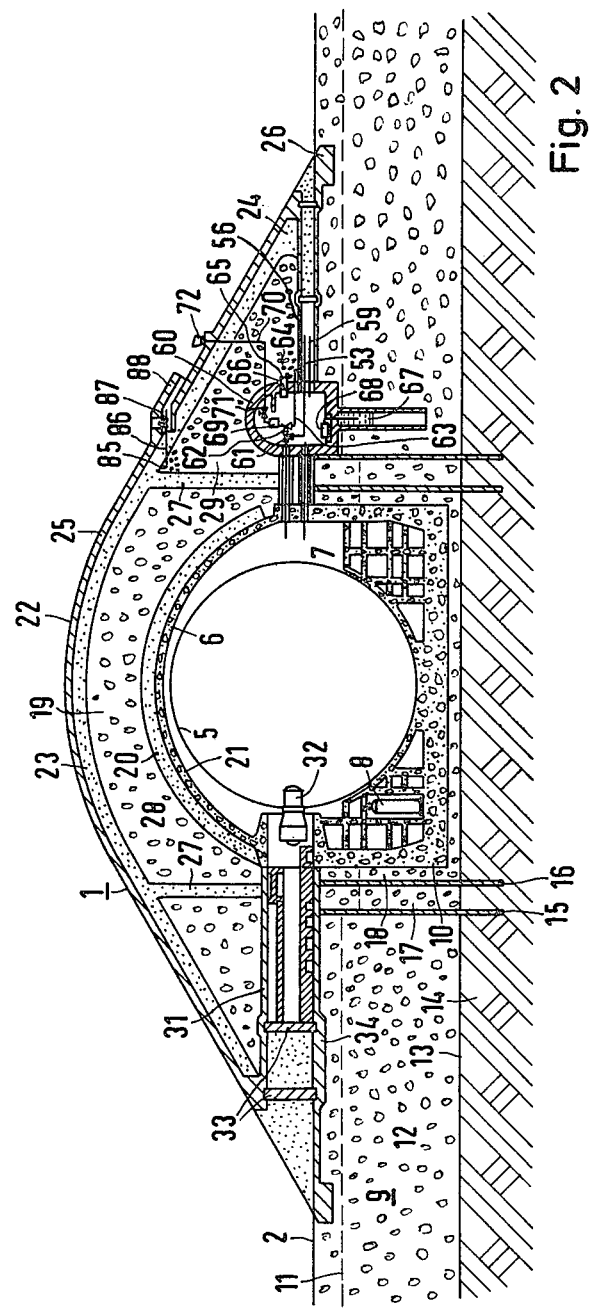

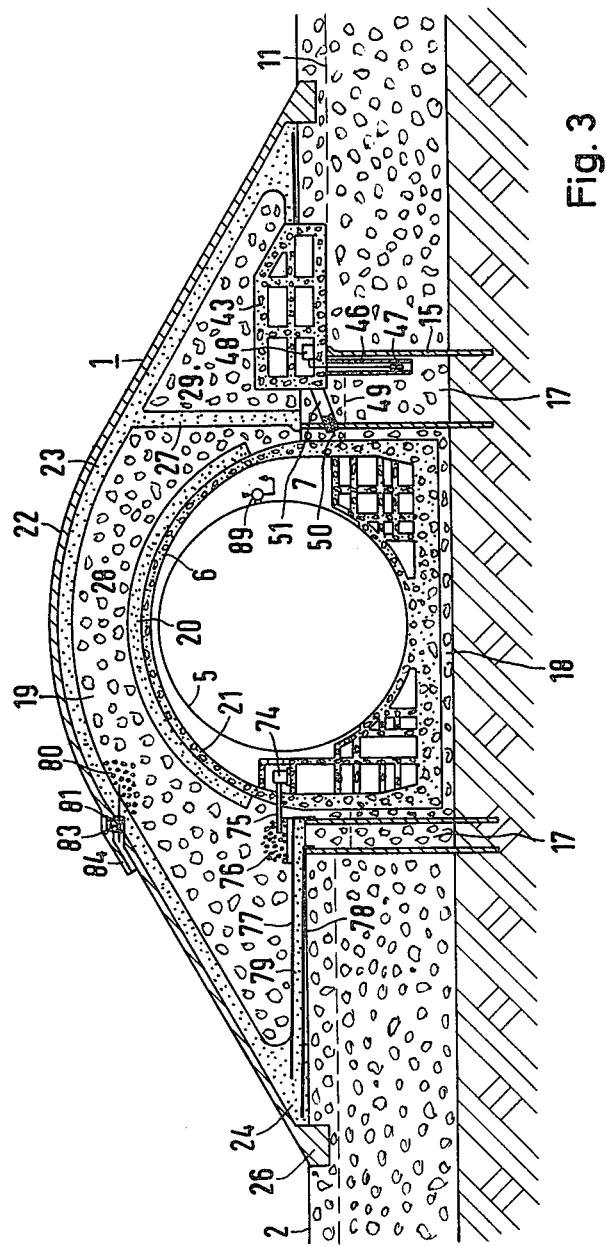

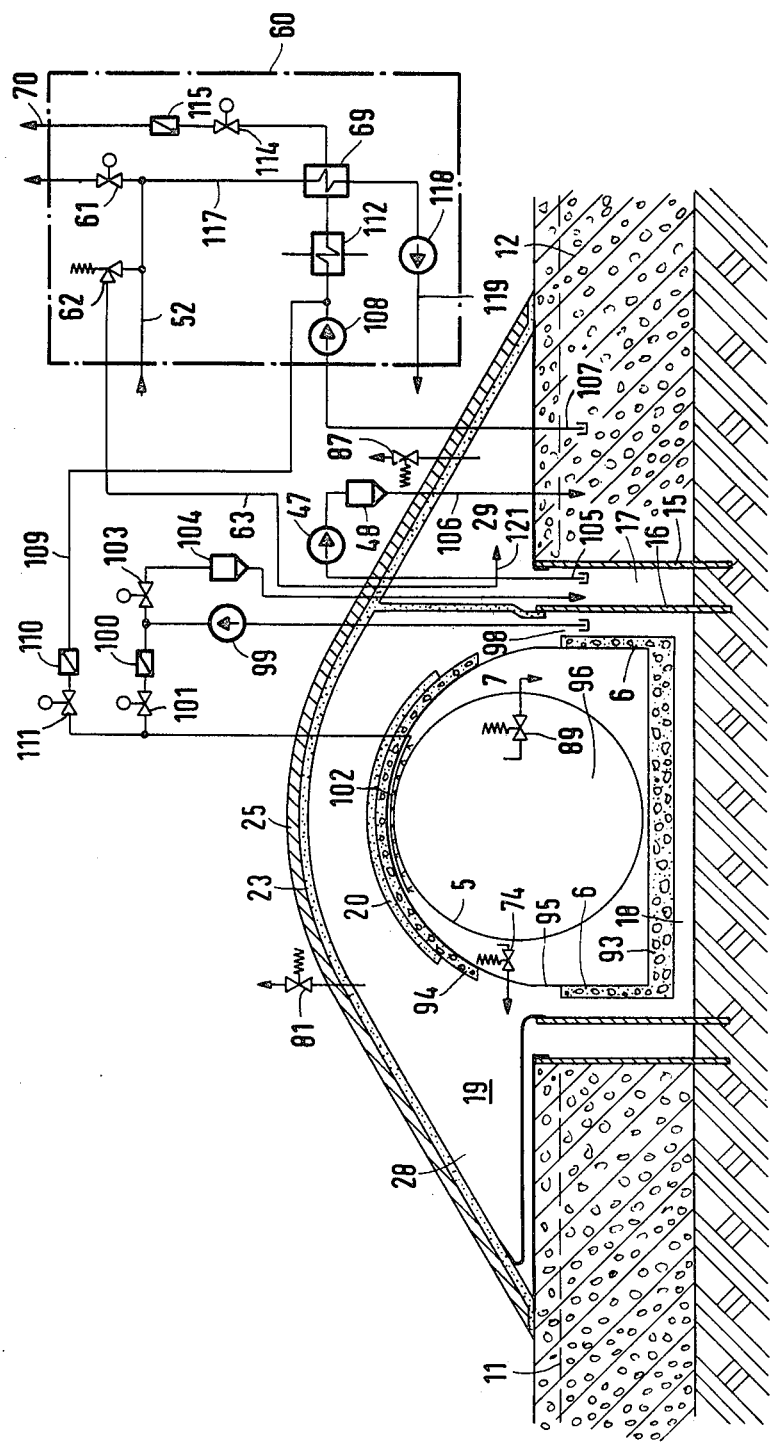

NUCLEAR REACTOR INSTALLATION

The invention relates to a nuclear reactor installation with a concrete cell disposed beneath the earth of a hill for enclosing activity-carrying components. Such a nuclear reactor installation is described, for example, in the German-language journal, "Atomwirtshaft", July/August 1975, pages 363 to 366. No details are given therein, however, regarding the spatial construction thereof.

Furthermore, a paper with the same theme entitled "Underground Siting of Nuclear Power Reactors" has appeared which had been prepared for a Symposium in Vienna. In this paper, a nuclear reactor installation is illustrated in FIG. 1 thereof wherein not only the nuclear reactor but also the machinery building supplied thereby are disposed in the ground or earth. The construction of the machinery building is only hinted at, though. It is apparent, nevertheless, that a light structure was involved having a volume of at least the same order of magnitude as that of the concrete cell with the activity-carrying components.

It is accordingly an object of the invention to provide a nuclear reactor installation of the foregoing type which is improved from the standpoint of safety engineering, at relatively low expense, over corresponding installations of the prior art. It is a further object to provide an installation of such construction, that will be less susceptible to disturbances and, in the event disturbances should occur, will be less sensitive to consequential damages.

With the foregoing and other objects in view, there is provided, in accordance with the invention, a nuclear reactor installation having a concrete cell disposed beneath the earth of a hill for enclosing activity-carrying components comprising at least one additional concrete cell (auxiliary cell) disposed in the earth separated from the first-mentioned concrete cell (central cell), the additional concrete cell being one fortieth or less of the volume of the central cell, preferably one two-hundredths thereof, and being at least predominantly of shell-like construction, and including equipment of use for the nuclear reactor installation, such as secondary, emergency or auxiliary equipment, received in the additional concrete cell. This is seemingly at variance with the demand for limited expense, especially since one could believe or expect that anyway, through the underground type of construction in the earth of a hill, virtually complete protection at least against consequential damage from disturbances is provided. Actually, however, the division of secondary, emergency or auxiliary equipment into further separated concrete buildings permits first a complete exploitation of the increased security or safety connected with the underground type of construction, as explained hereinafter in clearer detail.

By "separated" there is meant, in this connection, that the individual concrete buildings are "floatingly" disposed, so that they can follow movements of the earth or ground independently of one another. This can be especially ensured by means of intermediately disposed pipes or channels which are provided with movable connectors, as will be described hereinafter. Such a separation, in fact, exists also for the machinery building according to the hereinaforementioned paper prepared for the Viennese Symposium. This machinery building is not only considerably larger, however, than the auxiliary cells according to the invention. It is also constructed as a purely rectangular building with flat walls, and is in no way of shell-like construction. The conventional machinery building is therefore capable of little resistance against outer and inner pressures. This is essentially the point of the invention, as will also be explained further hereinafter.

In accordance with another feature of the invention, the additional concrete cell is connected in a line through which energy is removed from the hill, and valve means are disposed in the additional concrete cell for closing off the energy removal line. In this manner, success is achieved in reliably closing off the inclusion or enclosure provided by the central concrete cell of the activity-carrying components in the sources of the line for, in contrast to an arrangement of valves within the central cell, it is impossible that valves in the auxiliary cell would be damaged or otherwise rendered inoperative due to disturbances in the central cell. The inclusion or enclosure especially reliably provided by the underground type of construction is thus, in accordance with the invention, additionlly protected through the disposition of additional auxiliary cells for the lines which extend out of the central cell.

The aforementioned embodiment of the invention is especially advantageous if the central or first-mentioned cell is part of a so-called double-containment. Thus, in accordance with a further feature of the invention, the first-mentioned or central concrete cell is spaced from and surround a tight containment for enclosing activity-carrying components and defines therewith an annular space, the line extending from the containment and, in addition to the valve means in the additional or auxiliary concrete cell, further means for provided in the containment and/or in the annular space for closing off the line. The further closure means in the containment can be formed in a pressurized water reactor by the steam generating tubes which, as is generally known, separate the activated primary cooling water from the virtually activity-free secondary coolant. Additional closure valves can also be provided, however, and in fact not only inside the containment and outside the central cell, but rather, in the annular space between the containment and the central cell, so that maximal security against the liberation of activity-carriers is provided.

The additional or auxiliary concrete cell, in accordance with yet another feature of the invention, has an outlet extending into the earth of the hill, the outlet having a cross section of at least 1 m². What is achieved is that also if a rupture of the line were to occur in the auxiliary cell, no overload is conceivable which would cause a too-high pressure in the interior of the auxiliary cell and thereby cause it to burst. The outlet can be constructed as a blow-down line that is provided with a unilaterally operating closure member disposed in the interior of the auxiliary cell. By closure members there is meant not only ckeck valves but also, for example, bursting or rupture discs which, due to a bracing construction, have a lower response pressure in the one direction than in the other. The blow-down line should terminate in a gravel pile or in pipes leading to the interior of the hill. The introduction of gases and vapors which would otherwise cause excess pressure, can thereby be facilitated, because the permeability of the hill materal is limited. Furthermore, a secondary safety valve can be connected to such a blow-down line in order, for example, to attain relief when excess pressure exists in the line that is to be closed off. By means of such a blow-down line, energy, for example, in the form of steam which has been produced during emergency cooling of the nuclear reactor, can be removed.

In accordance with another feature of the invention, a plurality of the additional or auxiliary concrete cells are spatially distributed around the first-mentioned or central concrete cell, the auxiliary cells being connected in respective lines thereof which energy is removed from the hill, and valve means are included which are respectively disposed in the auxiliary cells for closing off the respective energy removal lines. Preferably, the number of auxiliary cells correponds to the number of lines, it being advantageous for steam power plants to conceive of the live steam line, on the one hand, and the feedwater line, on the other hand, as one pipe system which passes through a common auxiliary cell. Besides such special auxiliary cells provided for the closure, other auxiliary cells may be provided wherein exclusively emergency equipment, for example, for emergency cooling, are accommodated, or auxiliary equipment, for example, groundwater filtering equipment, if these are to be especially safety housed independently of the central cell.

In accordance with a further feature of the invention, the auxiliary cell is connected in a line extending to the central cell for removing energy from the hill, the line extending through movably sealed pipes. What is attained thereby is not only that the line per se remains free from the pressure of the earth and from movements thereof, but rather also, that accessibility for inspections is provided. Channels built with the aid of such pipes, such as concrete pipes, for example, wherein the lines run, should also, at least by creeping, be accessible for inspection personnel. The pipes are advantageously of pressure-tight construction, the pressure tightness being not only determined with respect to the weight of the earth located above the pipes, but also with respect to the conceivable inner pressure, which might be produced in the event of a line rupture. The elastic joint connectors provided at the connecting locations cannot only be obtained through the hereinaforementioned seals but also, under suitable conditions through the construction of the connecting locations per se, for example, in the form of universal or ball-and-socket joints. Through the movable sealing of the pipes, which can be effected with yieldable sealing materials, such as rubber or with impermeable coverings in the form of clay strata or also tarpaulins or sheets formed of synthetic or plastic material, assurance is provided that relative movements, at least within limits, are possible, as may be produced by settling of the earth or by earthquakes. Notwithstanding these seals, and in accordance with an added feature of the invention, the pipes and the connecting openings produced accordingly at the central and the auxiliary cells are disposed above the maximal groundwater level or water table.

In accordance with an additional feature of the invention, the auxiliary cell is accessible only from the outside of the hill and not, however, from the central cell. What is achieved thereby is that the effects of disturbances in the interior of the central cell cannot have any effect upon the devices of the auxiliary cell. On the other hand, it should also not be possible that through the access to the auxiliary cell, any disturbances should be produced in the central cell which could release activity, as a result of military action or sabotage, for example.

In accordance with another feature of the invention, a well extends from the auxiliary cell into groundwater in the earth, which will usually be present underneath the nuclear reactor installation. With such a well which is disposed in the auxiliary cell and protected therein uninfluenced by the activity in the central cell, the groundwater level can be influenced so as to prevent a further spread or distribution of the radioactivity. In addition, such a well can also serve for emergency and-/or aftercooling. In accordance with a further feature of the invention, a plurality of redundant, spatially separated emergency cooling devices are mounted in the auxiliary concrete cells and a system of lines extending out of the central cell and associated with said emergency cooling devices.

The hill serves in devices according to the invention for enclosing or at least for delaying activity which can hypothetically occur by failure
(a) of the primary components of the nuclear reactor,
(b) of the containment enclosing these primary components, and
(c) of the concrete building of the central location.

In accordance with the invention, another control is provided, however, also for this, in all probability, impossible situation, from a practical standpoint. Thus, impermeable partitions, especially formed of clay, are disposed in the hill for separating regions of varying activity in case of a disturbance, the auxiliary cells being disposed in regions of minimal activity separated by the partitions. What is attained thereby is that the auxiliary cells are still relatively well accessible even in the event of the most unlikely disturbance, so that, for example, the inclusion or enclosure of the activity in the region of the auxiliary cells, it controllable somewhat through these extending lines and is accessible for maintenance. Further in accordance with the invention, the lines extend through recesses formed in the partitions, the recesses being considerably smaller than corresponding dimensions of the auxiliary cells, so that the necessary seals for the partitions are small. In accordance with an added feature of the invention, the partitions cover connections to the auxiliary cells so as to effect an additional sealing action.

For the case of a live steam line and/or a feedwater line that have already responded or been activated, a conical attachment location with a closure valve mounted thereat is provided because, with such a conical fastening location, a mechanically stable construction is able to be well united with a pressure-tight closure. For the same reasons, there is provided in accordance with an additional feature of the invention, that the line extends to the central cell and is formed as a double-wall pipe. The effect thereon is that in the event of a break in the line, the pressure released to the outside only acts upon the double-wall pipe which can be constructed so as to be adequately pressure-tight, without great expense, whereas otherwise one would have to contend with pressure increases in the concrete channel which could cause consequential damage.

As noted hereinbefore, the auxiliary cells should only be accessible from the outside in order to avoid effects from the region of the central cell or into that region. For the same reason, and in accordance with yet other features of the invention, the auxiliary cells are connected only through pressure-free access means or through pressure-tightly closed sluice passages or locks.

In accordance with yet a further feature of the invention, mechanically sturdy baffle plates are provided for preventing penetration of solid material into the auxiliary cells and the lines respectively connected thereto.

Although the auxiliary cells with their small volume, also during unified spatial removal from the central cell, are generally covered to such a height by the earth of the hill that mechanical effects from the outside are unlikely, it can be advantageous for the earth of the hill located above the auxiliary to have a tight cover layer or stratum that is bridged by a closable outlet or discharge line. The closable discharge lines ensures pressure relief during blow-down of steam from the auxiliary cell, which is produced during a line break, because an air cushion present in the hill can be pushed out without raising the cover layer of the hill.

The instant application is one of three application simultaneously filed by the applicant, related generally to the same subject matter although directed to different inventions therein.

Other features which are considered as characteristics for the invention are set forth in the appended claims.

Although the invention is illustrated and described herein as embodied in nuclear reactor installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic elevational view of a nuclear reactor installation of the hill-construction type seen on the whole;

FIG. 2 and FIG. 3 are vertical sectional views of FIG. 4, on a scale approximately four times larger than that of FIG. 1, respectively taken along the lines II—II and III—III in the directions of the arrows;

FIG. 5 is a schematic diagram of the layout of various lines for cooling, ventilating, and otherwise servicing the reactor superimposed upon a simplified vertical sectional view somewhat similar to that of FIG. 2.

Figure 4:
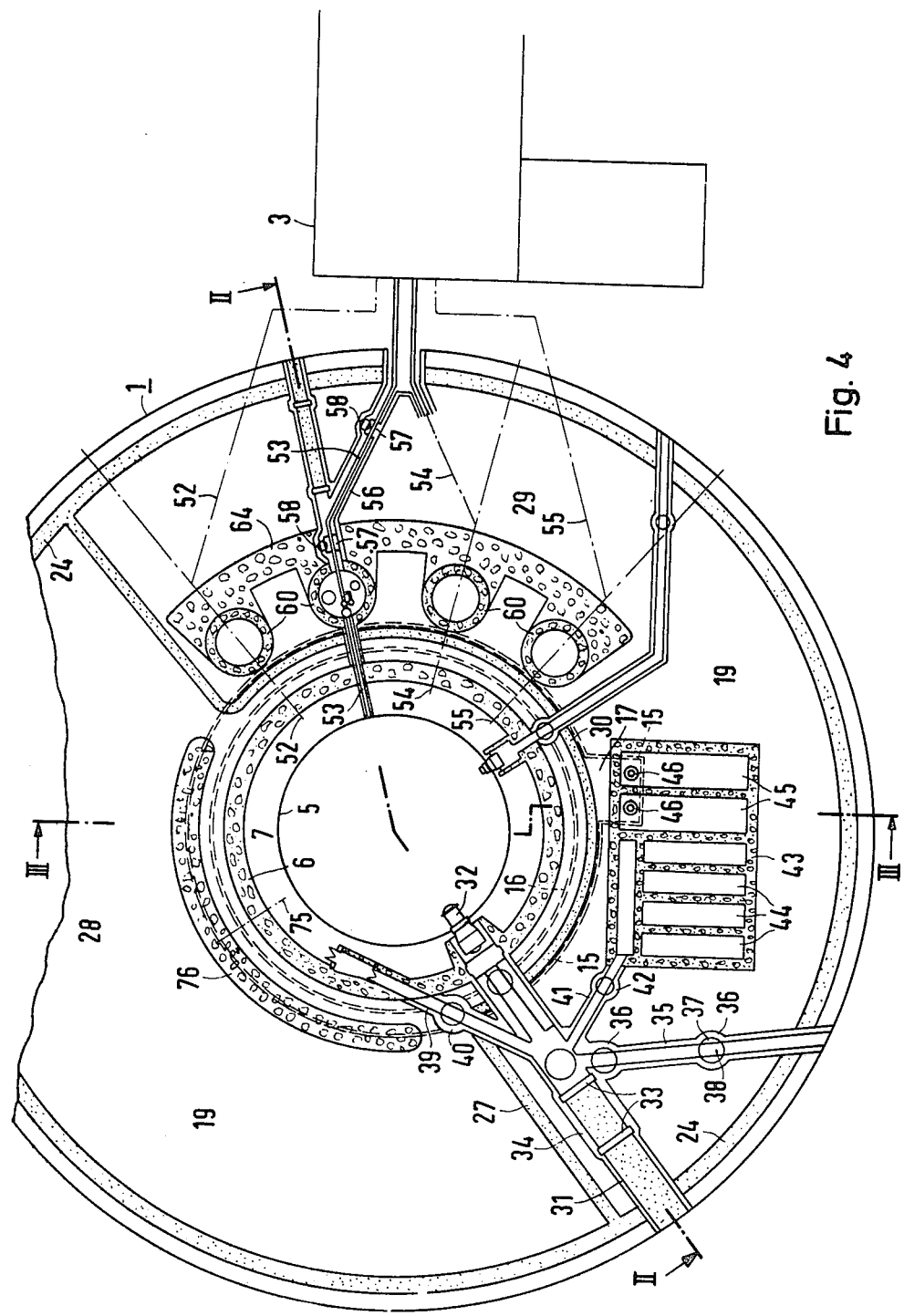
FIG. 4 is a horizontal sectional view of FIG. 2 taken along the line IV—IV in the direction of the arrow.

Referring now to the drawing and first, particularly, to FIG. 1 thereof, there is shown, on a very large scale of substantially 1:5000, a nuclear reactor installation disposed in a hill 1 which has been piled above the natural earth lever 2 to a height of 55 m, for example, and encloses the activity-carrying parts. The nuclear reactor installation generates steam which is converted into electric energy. This occurs in a machinery building 3. The waste heat produced in the produced in the process is given off to the atmosphere in a cooling tower 4, which may also be a dry cooling tower.

The reactor installation includes a pressurized-water reactor for 1200 MWe, for example, which corresponds to about 3800 MW$_{th}$. The activity-carrying components thereof i.e. those of the primary circulatory loop, are enclosed in a containment 5 (FIG. 2) that is constructed as a steel sphere, as is known, for example, from a brochure of Kraftwerk Union Aktiengesellschaft entitled "Pressurized-Water Reactor" dated May 1975, order No. 295. The steel sphere 5, which forms a first tight enclosure, is in turn enclosed in a concrete tank 6 corresponding to a so-called secondary shielding in heretofore known installations, and is disposed as a central cell in the middle of the hill 1. The volume of the central cell is 210,000 m$^3$. The annular space 7 between the steel sphere 5 and the concrete tank 6 contains auxiliary and accessory equipment, as is indicated by a floodwater tank 8 (FIG. 2).

As is apparent, the concrete tank 6 is sunk into the earth 9 below the surface 2 thereof. The foundation 10 of the concrete tank 6 extends below the natural water table 11 into the water-permeable sand and gravel layer 12 of the earth 9. The water table 11 is determined by the upper side 13 of a water-impermeable marl stratum 14.

Into the earth 9, two annular or ring walls 15 and 16 are sunk, which concentrically or coaxially surround the concrete tank 6, that is constructed as a solid of revolution. The walls 15 and 16 extend, for example, evenly 10 m deep into the water-impermeable stratum 14 and extend above to the surface 2 of the earth 9, as shown especially in FIG. 3. The walls 15 and 16 are formed, for example, of a bentonite layer 0.6 m thick which can be considered to be water-impermeable.

The walls 15 and 16 mutually enclose therebetween an intermediate space 17, also referred to as an annular zone, and an inner space 18 wherein the concrete tank 6 is received. The inner space 18 is in communication with a water- and gas-permeable gravel volume 19 constituting the major part of the hill 1. From this part 19 of the hill 1, the concrete tank 6 is separated only by a clay layer or stratum 20, for example, 3 m thick, which is seated like a cap on an upper portion 21 of the concrete tank 6. The cap 20 ensures that even if cracks should appear in the concrete tank 6, gases or liquids cannot excape directly below the crest 22 of the hill 1, because they reach the lower portion of the hill 1 only below the edge of the cap 20, so that, before they can escape to the outside, they must pass through the entire volume of the hill 1 which serves as a filter.

A clay layer 23 is disposed on the gravel volume 19 and forms the upper portion of the hill; like the clay layer 20, the clay layer 23 may have a thickness of 3 or 4 m. The clay layer 23 extends over the entire surface of the hill 1 down to the edge 24 thereof, where the clay layer 23 meets the ground level 2. It forms a self-healing, gastight closure for the gas carrying volume of gravel 19. The mechanical integrity of the clay layer 23 is established by a 1 to 2 m thick concrete layer (shatter or crash layer) 25 which is anchored to the ground 9 by a foundation ring 26. The crash layer 25 may, in some cases, also be assembled or piled up of stones or individual concrete elements, because it is of primary importance that the crash layer 25 prevent any direct external effects upon the clay layer 23.

The horizontal sectional view of FIG. 4 shows that the gravel volume 19 in the hill 1 is divided into two zones 28 and 29 of different size by a 3 m thick vertical partition 27 formed of clay. The larger zone 28 surrounds the concrete tank 6, since the wall 27 extends around the concrete tank 6 in an arc 30 which, in the horizontal sectional view of FIG. 4, is disposed between the walls 15 and 16.

A smaller zone 29 contains all the accesses or approaches extending through the hill 1 to the concrete tank 6. Among them is a main tunnel 31, which ends at a material lock 32 leading into the containment sphere 5. The main tunnel 31 is needed only for the transportation of large components which is required for effecting repairs. It is therefore closed during normal operation by safety or lock bolts 33 formed of concrete, which are inserted into the concrete wall 34 of the main tunnel 31. The remaining space is filled with clay, as shown in FIGS. 2 and 4.

The main tunnel 31 is connected to the edge 24 of the hill 1 by means of a secondary tunnel 35 extending at an angle therefrom. Shut-offs 36 are provided for the latter, which permit the tunnel 35 to be closed if required. The shut-offs 36 are formed of cylinders 37 having a through-opening 38, which can be closed by rotating the respective cylinder 37 through 90° from the position shown in FIG. 4. The main tunnel 31 is further adjoined by another secondary tunnel 39 leading into the annular space 7 between the containment sphere 5 and the concrete tank 6. This secondary tunnel 39 also contains a shut-off 40 in the form of a rotatable cylinder having a through-bore like that of the cylinder 37.

Yet another secondary tunnel 41 is connected to the main tunnel 31 and leads through a shut-off 42 to an emergency building 43. The emergency building 43 is a strong concrete structure and contains, a bulkheaded individual chambers 44, emergency equipment required for emergency operation, such as emergency diesel units and emergency cooling equipment, for example, insofar as they are not located in the annular zone 7.

Respective pumping installations 47 with filter stations 48 are located in two additional chambers 45 of the emergency building, as is seen in detail in FIG. 3. Also, as shown in FIG. 4, these chambers 45 extend over the wall 15, which bulges out at this location. Therefore, the pumping installation 47, which is in the form of an immersion pump surrounded by a shaft 46 can draw ground water from the intermediate space 17 and force it into the space outside the wall 15 through the filter station 48. Thereby, a lower water table 49 is produced in the spaces 17 and 18. This "underpressure" or "negative pressure" prevents the likelihood of any possible radioactivity being washed or flushed with the ground water out of the region enclosed by the wall 15. The filter station 48, which may include wire filters, cellulose filters and activated-carbon filters, ensure the desired purity of the water pumped to the outside.

The filter station 48 can also be used if ground water is to be pumped through another line 50, which extends into the inner space 18 through an inclined shaft 51. Thus, ground water, which runs through the filter station 48, can be pumped from the inner space 18 into the part of the ground 9 located outside the wall 15. The line 50 can also serve to pump water from the annular space 17 into the inner space 18, should an overloading of the filter prevent the delivery of activity-free water to the outside. This could happen, however, only in the event of a completely unlikely serious accident if the reactor core should melt through the concrete tank 6.

In the illustrated embodiment of the invention, it is assumed that the primary circulatory loop of the pressurized-water reactor inside the containment sphere 5 includes four steam generators. From the latter, four steam lines 52, 53, 54 and 55 extend as can be seen in FIG. 4. They are constructed, at least in the annular zone 7, as double lines and lead through separate tunnels 56 from the concrete tank 6 to the machinery building 3. These tunnels 56 are formed of concrete tubes which float in the ground 9 and are flexibly connected through elastic seals. They are assembled at angles to one another in order to prevent direct action from the outside on the concrete tank 6. In addition, in the vicinity of baffle plates 57, which also serve for bracing and fixing the steam lines 52 to 55, smaller shutoffs 58 are provided, by which the part of the tunnels 56 which is accessible for inspecting the lines 52 to 55 can be shut off. Parallel to the main or live steam lines 52 to 55, feedwater lines 59 extend through the tunnels 56, as is indicated in FIG. 2.

The tunnels 56 for the connecting lines 52 to 55 and 59, as well as the main tunnel 31 and the secondary tunnels 35, 39 and 41, run exclusively through the zone 29. Along the length of each of the tunnels 56, a respective concrete cell 60 is located at the end thereof facing the concrete tank 6, directly at the partition 27. The four concrete cells 60 are constructed and equipped in a similar manner. They are pressure-proof structures of shelltype or monococque construction in the form of vertical cylinders with a hemispherical roof or ceiling, which are designed for an internal pressure of 15 bar. The cells 60 have volumes of 1,700 m$^3$, respectively, which is only 1/120 the volume of the concrete tank 6. The concrete cells 60 and the tunnels 56 are located above the ground water level or table 11, so that the elastically sealed connecting openings also remain free of ground water. Simultaneously, by means of conical fastening locations of the pressure lines 52 to 55 and 59, which are constructed as double-walled lines, pressure-tight bulkheading in the vicinity of the concrete cells 60 is assured.

The concrete cells 60, as auxiliary cells, separate from the concrete tank 6, contain the valves which are necessary for the operation of the installation and which are mounted predominantly at the aforementioned fastening locations as described in copending application Ser. No. 700,910, filed June 29, 1976 of which applicant is a coinventor. Among the valves in the concrete cells 60 is a shut-off valve 61 constructed as a corner valve in the train of the steam lines 52 to 55, to which a safety valve 62 is connected. From the safety valve 62, a relief line 63 extends out of the auxiliary cell 60 to a gravel bed 64 which extends along one side of the zone 29, as can be seen in FIG. 4, and is connected to each of the auxiliary cells 60. Additional discharge or outlet openings formed in pipes 65 and having a cross section of 5 m$^2$, extend into the gravel bed 64, the outlet openings being closed off by diaphragms 66. Relief is thereby assured, for example, in the event of a break in the 70-bar main steam line in the auxiliary cell 60, to an extent that the permissible internal pressure in the cell 60 is not exceeded. Through the line 63, activity-carrying steam from the safety valve 62 can also be discharged for relieving pressure in the event of an accident.

A deep well 67 is associated in the same manner with each of the auxiliary cells 60. Activity-free ground water can be drawn from the deep wells 67 by means of a pump 68 and fed to a socalled tertiary evaporator 69. Live steam (secondary steam) from the lines 52 to 55 can be fed to the tertiary evaporators 69. Therefore, heat can be removed by the tertiary evaporators 69, should the normal heat sink of the turbines and the after-cooling or recooling system of the nuclear reactor installation also fail. Since this heat removal by the tertiary evaporators is separated from the secondary circulatory loop of the nuclear reactor, the steam can be given off directly to the outside through a relief or discharge line 70 with a shut-off valve 71, and also with a sound absorber 72 located on the surface of the hill, since no activity can be discharged therewith. For the shock-like or pulsating elimination of small amounts of heat through the safety valve 62, a blow-down or relief tank filled partly with water, in conventional manner, and set up for condensing the steam, can be disposed in each of the auxiliary cells 60.

A valve system 74 is associated with the annular space 7 between the safety containment sphere 5 and the concrete tank 6, and is connected to relief lines 75. The valve system 74 is supposed to ensure that the concrete tank 6 will not blow up even if, in the case of an accident, steam should escape from the containment sphere 5 and thereby pose the threat that the pressure strength of the concrete tank might be exceeded. This strength is especially defined by the bearing pressure of the materials forming the hill 1. For example, a pile 20 m high with a specific gravity of 2 tons/m$^3$ produces an outer excess pressure of about 4 bar upon the concrete tank 6. This pressure relieves the dome or vault-like concrete shell of tensile stress as long as the internal excess pressure or overpressure does not reach a higher value. The valve system 74 encompasses preferably one or more safety valves with a relatively low response overpressure of, for example, 1 bar and a small relief cross section. The small quantities of air and steam, such as are anticipated in the initial phase of the hypothetical failure of the containment sphere 5 can thereby be discharged. In addition, however, additional safety valves with large relief cross section and responsive to a higher pressure are provided.

With this possible system of pressure relief or exhaust which has, for example, twice the cross section, rupture of the concrete tank 6 can be prevented also if, due to intense heating resulting from a possible core meltdown, large amounts of steam are abruptly generated due to a sudden inrush of the water volume, for example, coming, perhaps, from the fuel-element pit and exceeding the storage capacity of the concrete tank 6.

The relief or exhaust lines 75 lead to a large gravel bed 76 in the zone 28. From there, the steam can be distributed in the volume of gravel 19 of the hill 1. This ensures filtering and condensation of the steam, so that no radioactive parts can penetrate directly to the ambient environment. Due to the provision of two gastight sheets 77 and 78 of plastic material extending virtually parallel to each other, assurance is provided also that the radioactivity cannot be rinsed into the free ground water by water which is produced, for example, as condensate. The sheets 77 and 78 of plastic material, on the contrary, with the slightly conical disposition thereof, form runoff surfaces, by which such water is normally conducted into the inner region 18 of the wall 16. In the event that the sheet 77 of plastic material, which lies on a lower clay layer 79, should be damaged, the lower sheet 78 of plastic material disposed in the clay layer 79 ensures that leakage water or rain water can flow out of the region 19 only into the intermediate space 17.

In the upper region of the gravel volume 19 i.e. below the clay layer 23, passageways or outlets may be provided such as are shown in FIGS. 2 and 3. For this purpose, a semicircular bed 80 of coarse gravel is provided which forms a collecting space in the zone 28. At that location, there starts a line 81 with a shut-off valve 82 leading to the outside through the clay layer 23 and the crash layer 25, the shut-off valve 82 being manually actuatable by means of a spindle 83. The outlet of the line 81 is covered by a hood 84, which serves as protection from rain water. The hood 84 simultaneously provides mechanical protection for the line 81, however.

The zone 29 can likewise be provided with a gravel bed 85, which is located at the highest point of this zone 29 and forms a collecting space thereat for the outlet line 86 which has a valve 87 and a covering hood 88.

The discharge lines 81 and 86, only a single one of which may also be provided, permit relief of pressure applied to the hill 1 by air that might be displaced in the event of an accident, thereby preventing the clay layer 23 from breaking open. The valves 82 and 87 can, for example, be subject to pressure-dependent control, in that they are opened at overpressures or excess pressures greater than 0.5 bar and at underpressures greater than 0.2 bar. However, they may, in addition, be subject to activity-dependent actuation, by which closure is effected independently of the pressure, should this escaping medium be radioactive.

In FIG. 5, there is shown diagrammatically, a safety valve 89 which relieves the containment 5, for example, in the event of an overpressure of 5 bar, by discharging into the concrete tank 6. This safety valve 89 is supposed to prevent the pressure in the containment 5 from increasing beyond design pressure (6 bar) if the emergency cooling should fail and a break in a pressure-carrying line in the containment 5 should simultaneously occur. The energy content of the containment 5 is limited to a value which can also be absorbed by the concrete tank 6 (4 bar) upon sudden failure of the containment 5. The line cross section of the valves of the valve system 74, which are designed for a low response pressure, can therefore be throttled greatly, for example, to four openings with 20 cm diameter, since only the residual heat of the reactor, which has already been shut down for some time, must be released. This permits a steady condensation of the steam in the gravel volume 19 and only a moderately heavy production of exhaust air in the line 81, so that the cross section of the latter can also remain small (4×20 cm).

In the schematic view of FIG. 5, the concrete tank 6 is shown with varying wall thicknesses. This is to indicate that it is formed, in the lower part thereof, of a mechanically sturdy tray 93 and in the upper part thereof, of a likewise mechanically sturdy cap 94. In the middle region 95 thereof, however, a given amount of permeability in the event of overloads or excess pressure may be provided or may occur. The concrete cap 94 is formed of a heat-resistant grade of concrete and supports the clay layer 20.

As is apparent, the interior 96 of the spherical containment shell 5 is connected by means of safety valves 89 to the annular space 7 between the containment sphere 5 and the concrete tank 6. The response value of the safety valves 89 should, in fact, be as high as possible, but should ensure, on the other hand, that the containment sphere 5 can never be ruptured suddenly when the pressure increases, because relief through the safety valves 89 will have taken place first.

The annular space 7, on the other hand, is connected in the region 95 of the concrete tank 6 to the so-called high-activity zone 28 of the gravel volume 19 through the valve system 74. The valves 74 have, for example, an overpressure response of 4 bar.

The zone 28 is again connected to the atmosphere above the hill 1 through valves 81 which are openable in dependence upon pressure and have an overpressure or excess pressure response of 0.5 bar. This is to prevent the hill 1 from being broken open in the region of the clay layer 23 serving as a sealing skin, so that gases or vapors escape in concentrated form. For a greater weight of the clay layer 23 and/or the crash layer 25 covering it, a correspondingly higher response value of the safety valves 82 can also be chosen.

In the interior space 18 within the inner wall 16, a well 98 is provided, from which a pump 99 can draw water. The pump operates only in the case of accidents which threaten the containment sphere 5 and the concrete tank 5. The water is pumped through a check valve 100 and a control valve 101 to a spraying device 102, which can cool the upper part of the containment 5, so that a lowering of the pressure in the containment 5 can be attained. The pump 99 can furthermore be delivered through a control valve 103 and a filter 104 into the space 17 between the two walls 15 and 16. In the space 17, the well 105 with the immersion pump 47 is provided, which pumps ground and leakage water through the filter station 48 into the region outside the wall 15 of the ground-water bearing layer 12, as indicated by the line 106.

Another well 107, which is installed redundantly fourfold and is designed, for example, for $4 \times 150$ m$^3$/h, serves to feed a pump 108. The latter can supply the spraying device 102 through a line 109 with a check valve 110 and a control valve 111. The pump 108 further supplies coolers or intermediate heat exchangers 112, which are required, for example, for cooling emergency-power diesel sets. The water coming from the cooler 112 can also be fed, if required, to the tertiary evaporator 69, with which the energy of the nuclear reactor installation is utilized for the generation of steam in the event the normal heat sinks fail as described in copending application Ser. No. 746,176, filed Nov. 30, 1976, of which applicant is a coinventor. The steam then generated can be conducted to the relief or discharge 70 through a control valve 114 and a check valve 115.

The tertiary evaporator 69 is connected through a line 117 to the live steam line 52, which, in the normal case, leads to the turbine through the shut-off valve 61. The safety valve 62 at the live steam line 52 allows steam to be blown off into the so-called low-activity zone 29 of the gravel volume 19, as indicated by the line 63 and the outlet 121 thereof. The air normally present in the soil can then be blown off through the excess pressure valve 87, if the excess pressure exceeds 0.5 bar when the steam is introduced.

The pump 108 for both the cooler 112 and the tertiary evaporator 69 together with the shut-off device 61 of the live steam line 52 and the safety valve 62 connected thereto, is housed in the auxiliary cell 60, indicated diagrammatically in FIG. 5 by the box shown in dot-dash lines, which is situated in the ground of the hill 1, as shown in FIGS. 2 to 4. This auxiliary cell 60 also contains another pump 118, with which the condensate (feedwater) present in the tertiary evaporator 69 is returned to the steam generator through a line 119.

In the illustrated embodiment, it is shown that the safety valve 89 of the containment sphere 5 leads into the annular space 7, from which additional safety valves of the valve system 74 afford pressure relief. A direct relief line from the containment sphere 5 into the "high-activity" zone 29 of the gravel volume 19 may also be provided, however, so that pressure relief can be effected for the containment 5 without adversely affecting the accessibility of the annular space 7.

There are claimed:

1. Nuclear reactor installation having a concrete cell disposed beneath the earth and having a hill of fill-earth directly covering the top of the concrete cell for enclosing activity-carrying components comprising at least one additional self-enclosed concrete cell disposed in the earth and being isolated and separated from the first-mentioned concrete cell by a given distance forming a space between said cells, said additional concrete cell having at most one-fortieth the volume of the first-mentioned concrete cell and being at least predominantly of shell-like construction, and including equipment of use for the nuclear reactor installation received in said additional concrete cell, said additional concrete cell being connected in a line extending from the first-mentioned concrete cell and out of the hill through which energy is removed from the hill, and including valve means disposed in said additional concrete cell for closing off said energy removal line.

2. Nuclear reactor installation according to claim 1 wherein the first-mentioned concrete cell is spaced from and surrounds a tight containment for enclosing activity-carrying components and defines therewith an annular space, said line extending from said containment, and including, in addition to said valve means in said additional concrete cell, further means in at least one of said containment and said annular space for closing off said line.

3. Nuclear reactor installation according to claim 1 wherein said additional concrete cell has an outlet extending into the earth of the hill, said outlet having a cross section of at least 1 m$^2$.

4. Nuclear reactor installation having a concrete cell disposed beneath the earth and having a hill of fill-earth directly covering the top of the concrete cell for enclosing activity-carrying components comprising at least one additional self-enclosed concrete cell disposed in the earth and being isolated and separated from the first-mentioned concrete cell by a given distance forming a space between said cells, said additional concrete cell having at most one-fortieth the volume of the first-mentioned concrete cell and being at least predominantly of shell-like construction, and including equipment of use for the nuclear reactor installation received in said additional concrete cell, said first-mentioned cell being centrally located, and including a plurality of said additional concrete cells spatially distributed around said central concrete cell, said additional concrete cells being connected in respective lines extending from the first-mentioned concrete cell and out of the hill through which energy is removed from the hill, and including valve means respectively disposed in said additional concrete cells for closing off the respective energy removal lines.

5. Nuclear reactor installation according to claim 1 wherein said additional concrete cell is connected in a line extending to said first-mentioned concrete cell for removing energy from the hill, said line extending through movably sealed pipes.

6. Nuclear reactor installation having a concrete cell disposed beneath the earth and having a hill of fill-earth directly covering the top of the concrete cell for enclosing activity-carrying components comprising at least one additional self-enclosed concrete cell disposed in the earth and being isolated and separated from the first-mentioned concrete cell by a given distance forming a space between said cells, said additional concrete cell having at most one-fortieth the volume of the first-mentioned concrete cell and being at least predominantly of shell-like construction, and including equipment of use for the nuclear reactor installation received in said additional concrete cell, said additional concrete cell being connected in a line extending from said first-mentioned concrete cell and out of the hill for removing energy from the hill, said line extending through movably sealed pipes, said pipes being of pressure-tight construction and being floatingly disposed in the earth, said pipes having mutually connecting locations at which they are provided with elastic joint connectors.

7. Nuclear reactor installation according to claim 5 wherein said pipes and connecting openings thereof with said first-mentioned and said additional concrete cells are disposed above maximal groundwater level.

8. Nuclear reactor installation according to claim 1 wherein said additional concrete cell is inaccessible from said first-mentioned concrete cell and is accessible only from outside the hill.

9. Nuclear reactor installation according to claim 1 including a well extending from said additional concrete cell into groundwater in the earth.

10. Nuclear reactor installation according to claim 4 including a plurality of redundant, spatially separated emergency cooling devices mounted in said additional concrete cells and associated with said lines, respectively, said lines extending from said centrally located concrete cell.

11. Nuclear reactor installation according to claim 1 including impermeable partitions disposed in the hill for separating regions of varying activity in case of a disturbance, said additional concrete cell being disposed in a region of minimal activity separated by said partitions.

12. Nuclear reactor installation according to claim 11 wherein said partitions are formed of clay.

13. Nuclear reactor installation according to claim 4 including impermeable partitions disposed in the hill for separating regions of varying activity in case of a disturbance, said additional concrete cells being disposed in regions of minimal activity separated by said partitions, said lines extending through recesses formed in said partitions, said recesses being considerably smaller than corresponding dimensions of said additional concrete cells.

14. Nuclear reactor installation according to claim 13 wherein said partitions cover connections to said additional concrete cells so as to effect an additional sealing action.

15. Nuclear reactor installation according to claim 1 including a conical attachment location in said additional concrete cell for a valve mounted thereat, said valve being in at least one of a live steam and a feedwater line for closing said line.

16. Nuclear reactor installation having a concrete cell disposed beneath the earth and having a hill of fill-earth directly covering the top of the concrete cell for enclosing activity-carrying components comprising at least one additional self-enclosed concrete cell disposed in the earth and being isolated and separated from the first-mentioned concrete cell by a given distance forming a space between said cells, said additional concrete cell having at most one-fortieth the volume of the first-mentioned concrete cell and being at least predominantly of shell-like construction, and including equipment of use for the nuclear reactor installation received in said additional concrete cell and a conical attachment located in said additional concrete cell for a valve mounted thereat, said valve being in at least one of a live steam and a feedwater line for closing said line, said line extending to said first-mentioned concrete cell and being formed as a double-wall pipe.

17. Nuclear reactor installation according to claim 1 including a discharge line extending from said additional concrete cell into the earth of the hill, unilaterally acting closing means disposed within said additional concrete cell for closing said discharge line.

18. Nuclear reactor installation having a concrete cell disposed beneath the earth and having a hill of fill-earth directly covering the top of the concrete cell for enclosing activity-carrying components comprising at least one additional self-enclosed concrete cell disposed in the earth and being isolated and separated from the first-mentioned concrete cell by a given distance forming a space between said cells, said additional concrete cell having at most one-fortieth the volume of the first-mentioned concrete cell and being at least predominantly of shell-like construction, and including equipment of use for the nuclear reactor installation received in said additional concrete cell and a discharge line extending from said additional concrete cell into the earth of the hill, unilaterally acting closing means disposed within said additional concrete cell for closing said discharge line, said discharge line terminating in a gravel pile extending into the interior of the hill.

19. Nuclear reactor installation having a concrete cell disposed beneath the earth and having a hill of fill-earth directly covering the top of the concrete cell for enclosing activity-carrying components comprising at least one additional self-enclosed concrete cell disposed in the earth and being isolated and separated from the first-mentioned concrete cell by a given distance forming a space between said cells, said additional concrete cell having at most one-fortieth the volume of the first-mentioned concrete cell and being at least predominantly of shell-like construction, and including equipment of use for the nuclear reactor installation received in said additional concrete cell and a discharge line extending from said additional concrete cell into the earth of the hill, unilaterally acting closing means disposed within said additional concrete cell for closing said discharge line, said discharge line terminating in a pipe extending into the interior of the hill.

20. Nuclear reactor installation having a concrete cell disposed beneath the earth and having a hill of fill-earth directly covering the top of the concrete cell for enclosing activity-carrying components comprising at least one additional self-enclosed concrete cell disposed in the earth and being isolated and separated from the first-mentioned concrete cell by a given distance forming a space between said cells, said additional concrete cell having at most one-fortieth the volume of the first-mentioned concrete cell and being at least predominantly of shell-like construction, and including equipment of use for the nuclear reactor installation received in said additional concrete cell and a discharge line extending from said additional concrete cell into the earth of the hill, unilaterally acting closing means disposed within said additional concrete cell for closing said discharge line, said discharge line being connected to a secondary safety valve.

21. Nuclear reactor installation according to claim 1 including a tight cover layer covering the earth of the hill, and including a closable outlet line extending from the earth of the hill through said tight cover layer to the outside thereof.

22. Nuclear reactor installation according to claim 4 including pressure-free access means for connecting said additional concrete cells.

23. Nuclear reactor installation according to claim 4 including pressure-tightly closed sluice passages for connecting said additional concrete cells.

24. Nuclear reactor installation according to claim 4 including mechanically sturdy baffle plate means for preventing penetration of solids into said additional concrete cells and said lines respectively connected thereto.

25. Nuclear reactor installation according to claim 1 wherein said additional concrete cell is covered by substantially as much of a covering of the hill as is the first-mentioned concrete cell.

* * * * *